United States Patent [19]

Nakamura et al.

[11] Patent Number: 4,804,872
[45] Date of Patent: Feb. 14, 1989

[54] ROTOR OF A BUILT-IN MOTOR

[75] Inventors: Kousei Nakamura, Tokyo; Takashi Yoshida, Kawagoe, both of Japan

[73] Assignee: Fanuc Ltd., Minamitsuru, Japan

[21] Appl. No.: 82,387

[22] PCT Filed: Dec. 11, 1986

[86] PCT No.: PCT/JP86/00629
§ 371 Date: Sep. 30, 1987
§ 102(e) Date: Sep. 30, 1987

[87] PCT Pub. No.: WO87/03749
PCT Pub. Date: Jun. 18, 1987

[30] Foreign Application Priority Data
Dec. 12, 1985 [JP] Japan ................. 60-190328

[51] Int. Cl.$^4$ ............................................ H02K 15/00
[52] U.S. Cl. ...................................... 310/42; 310/66; 310/91; 310/112; 310/261
[58] Field of Search ............ 310/261, 273, 262, 66, 310/263, 43, 272, 112, 264, 91, 265, 267, 42; 29/235, 450, 598; 464/901; 403/5, 15, 31; 92/89

[56] References Cited

U.S. PATENT DOCUMENTS

| 1,612,321 | 12/1926 | Soderberg | 310/265 |
| 1,649,119 | 11/1927 | Kjelsberg | 310/265 |
| 2,301,424 | 11/1942 | List | 310/263 |
| 3,865,497 | 2/1975 | Bratt | 403/15 |
| 4,206,379 | 6/1980 | Onda | 310/43 |
| 4,456,396 | 6/1984 | Damratowski | 403/15 |
| 4,658,165 | 4/1987 | Vanderschaeghe | 310/261 |

FOREIGN PATENT DOCUMENTS

| 0027753 | 2/1983 | Japan. |  |
| 0118901 | 2/1927 | Switzerland | 403/15 |
| 0625899 | 9/1978 | U.S.S.R. | 403/15 |

Primary Examiner—R. Skudy
Attorney, Agent, or Firm—Staas & Halsey

[57] ABSTRACT

A rotor of a built-in motor includes a shaft having a stepped part and a sleeve having a hollow space arranged to cover the stepped part of the shaft and a hydraulic pressure supply means. The sleeve is fitted with the shaft at the stepped part. A core is fitted with the sleeve. Hydraulic pressure applied to the hollow space within the sleeve via the hydraulic pressure supply means loosens the fit between the sleeve and the shaft, thereby allowing the shaft to be readily removed from the sleeve and core portion.

9 Claims, 2 Drawing Sheets

ROTOR OF A BUILT-IN MOTOR

BACKGROUND OF THE INVENTION

1. Field of the Invention

This invention relates to a rotor of a built-in motor. More specifically, this invention relates to an improvement applicable to the structure of a rotor of a built-in motor, for the purpose of enabling the shaft of the built-in motor to be readily removed from the core of the built-in motor.

2. Description of the Related Art

It is not necessarily difficult to fit the shaft of an electric motor with the core of the electric motor, because various convenient methods, such as force fit, shrinkage fit, etc., are available. It is not necessarily easy, however, to remove the shaft of an electric motor from the core of the electric motor, because application of a considerable magnitude of heat, pressure or the like is generally required for this purpose.

Since a built-in motor has a stator which is mounted, with a flange, on a machine which is driven by the built-in motor, and since it has a rotor which is fitted with the shaft of the machine which is driven by the built-in motor, the core is inclined to be frequently required to be removed from the shaft.

Therefore, a structure which allows a shaft to be readily removed from a core is desirable for a built-in motor.

SUMMARY OF THE INVENTION

The object of this invention is to provide a rotor of a built-in motor having a structure which allows the shaft to be readily removed from the core part thereof, whenever it is required.

To achieve the above mentioned object, a rotor of a built-in motor in accordance with this invention is provided:

- a shaft (1) having a stepped part (11);
- a sleeve (2) having a hollow space (21) arranged to cover the stepped part (11) and a hydraulic pressure supply means (22) and being fitted with the shaft (1) having the stepped part (11); and
- a core (3) being fitted with the sleeve (2).

In other words, a rotor of a built-in motor in accordance with this invention has a core (3) which is fitted with a sleeve (2) which is further fitted with a shaft (1), remaining a hollow space (21) therein at a location to cover a stepped part (11) of the shaft (1). The sleeve (2) has a hydraulic pressure supply means (22) for supplying hydraulic pressure into the hollow space (21) which is asymmetrical from side to side (or which has one end (23) whose area is larger than that of the other end (24)). Therefore, the core (3) and sleeve (2) can readily be removed from the shaft (1) by applying hydraulic pressure to the hollow space (21) employing the above mentioned hydraulic pressure supply means (22), because it exerts a thrust in the direction of the shaft (1) based on the above mentioned asymmetry of the above mentioned sleeve (2) (or based on the difference in area of the one end (23) and the other end (24) of the above mentioned sleeve (2)).

DETAILED DESCRIPTION OF A PREFERRED EMBODIMENT

Figure 1:
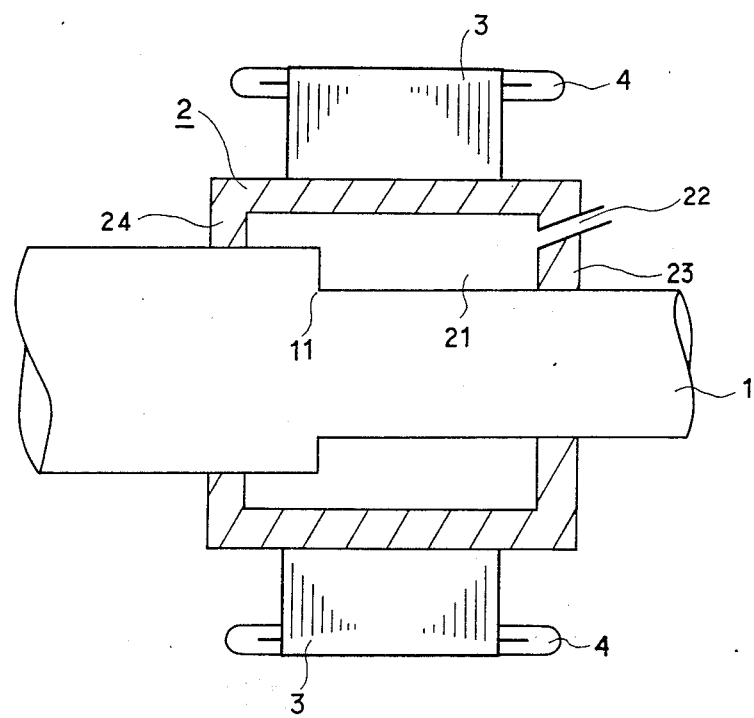
FIG. 1 is a cross-sectional view showing the assembled position of the rotor of a built-in motor of one embodiment of this invention.

Referring to FIG. 1, a shaft 1 (which is usually the shaft of a machine driven by the built-in motor, not shown in the drawings) has a stepped part 11. A sleeve 2 has a hollow space 21 therein. The one end 23 of the sleeve 2 is fitted with the shaft 1 on the right side of the stepped part 11 as shown in the drawing (or the one end 23 of the sleeve 2 is fitted with the shaft 1 at a location at which the diameter of the shaft 1 is smaller), and the other end 24 of the sleeve 2 is fitted with the shaft on the left side of the stepped part 11 as shown in the drawing (or the one end 24 of the sleeve 2 is fitted with the shaft 1 at a location at which the diameter of the shaft 1 is larger). As a result, the sleeve 2 is asymmetrical from side to side. The sleeve 2 has a hydraulic pressure supply means 22 for supplying hydraulic pressure into the hollow space 21 of the sleeve 2.

A rotor core 3 having a set of windings 4 is permanently fitted on the sleeve 2. In other words, there is little chance for the core 3 to be removed from the sleeve 2.

When this rotor is assembled, the core 3 is fitted with the sleeve 2. Then, the sleeve 2 is heated, before it is pushed to the left and if fitted with the shaft 1 with the shrinkage fit, as shown in the drawing.

Figure 2:
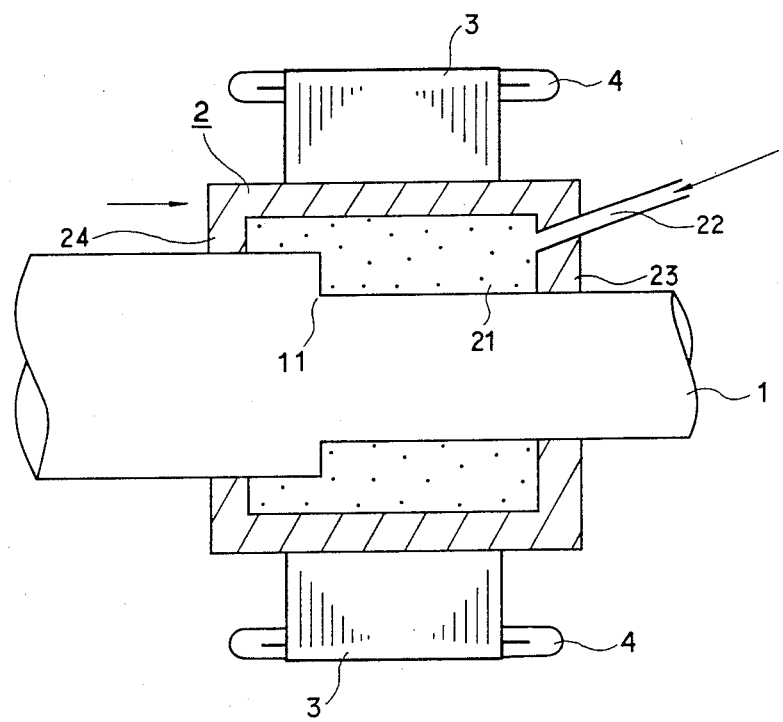
FIG. 2 is a cross-sectional view showing the rotor of a built-in motor of the embodiment of FIG. 1 being disassembled in which the sleeve carrying the core is removed from the shaft.

Referring to FIG. 2, when this rotor is disassembled (or when the sleeve 2 is removed from the shaft 1), hydraulic pressure with a high pressure of approximately 700 Kg/cm$^2$ is applied into the hollow space 21, employing the hydraulic pressure supply means 22.

An application of this magnitude of hydraulic pressure causes the sleeve 2 to be elastically deformed, and the friction between the both ends 23 and 24 of the sleeve 2 and the shaft 1 is decreased due to a decrease in the pressure between the sleeve 2 and the shaft 1. As a result, even a little difference in the area existing between the both ends 23 and 24 of the sleeve 2, readily causes the sleeve 2 to be shifted in the direction of an arrow shown in the drawing (in the direction from the end whose area is smaller to the end whose area is larger) and resultantly to be removed from the shaft 1. In this way, the core 3 can readily be removed from the shaft 1.

The foregoing description has clarified that this invention has successfully provided a rotor of a built-in motor having a structure which allows the shaft to be readily removed from the core thereof, whenever it is required.

Although the foregoing description was presented referring to a specific embodiment, this is not meant to be construed in a limiting sense. Various modifications of the disclosed embodiment, as well as other embodiments of this invention, will be apparent to persons skilled in the art upon reference to the description of this invention. It is therefore contemplated that the appended claims will cover any such modifications or embodiments as fall within the true scope of this invention.

We claim:

1. A rotor of a built-in motor comprising:
   a shaft having a stepped part ;
   a sleeve having a hollow space arranged to surround said shaft at said stepped part, and a hydraulic pressure supply means for applying hydraulic pressure to said sleeve, reducing friction between said shaft and said sleeve and removing said sleeve from said shaft, said sleeve being fitted with said shaft having the stepped part; and a core fitted with said sleeve.

2. A motor built into a machine for driving the machine, comprising:

a shaft having a step between a relatively large diameter portion and a relatively small diameter portion thereof, said shaft being integral with the machine;

a hollow asymmetrical sleeve fitted about said shaft at the step;

hydraulic pressure supply means for supplying hydraulic pressure to said hollow sleeve to elastically deform said sleeve, reduce friction between said shaft and said sleeve and shift said sleeve away from the large diameter portion of said shaft in the direction of the small diameter portion so that said sleeve and said sleeve can be separated from said shaft; and a rotor core for driving said shaft fitted with said sleeve and separable from said shaft.

3. A motor according to claim 2, wherein said hollow asymmetrical sleeve is shrink fitted onto said shaft.

4. A motor according to claim 2, wherein said motor core further includes windings.

5. A motor according to claim 2, wherein said sleeve has a first end fitted with the large diameter portion of said shaft and a second end fitted with the small diameter portion of said shaft.

6. A motor built into a machine for driving the machine, comprising:

a shaft having a step integral with the machine for driving the machine, said shaft having a first portion with a first diameter on a first side of the step and a second portion having a second diameter, smaller than said first diameter, on a second side of the step;

a hollow sleeve fitted about said shaft having a first end fitted with the first portion of said shaft and a second end fitted with the second portion of said shaft;

hydraulic pressure supply means for supplying hydraulic pressure to said hollow sleeve to elastically deform said sleeve, reduce friction between said shaft and said sleeve and shift said sleeve away from the large diameter portion of said shaft and in the direction of the small diameter portion, so that said sleeve can be separated from said shaft; and a rotor core fitted with said sleeve and separable from said shaft, for driving said shaft.

7. A motor according to claim 6, wherein said sleeve is shrink fitted about said shaft.

8. A motor according to claim 6, wherein said removable separable rotor core further includes windings.

9. A motor according to claim 6, wherein the first end of said sleeve has a first area and the second end of said sleeve has a second area, the second area being larger than the first area.

* * * * *

UNITED STATES PATENT AND TRADEMARK OFFICE
CERTIFICATE OF CORRECTION

PATENT NO. : 4,804,872

DATED : February 14, 1989

INVENTOR(S) : Nakamura et al.

It is certified that error appears in the above-identified patent and that said Letters Patent is hereby corrected as shown below:

Col. 2, line 30, "if" should be --is--.

Col. 4, line 26, delete "remov-";
    line 27, delete "able".

Signed and Sealed this

Thirteenth Day of June, 1989

Attest:

DONALD J. QUIGG

Attesting Officer

Commissioner of Patents and Trademarks